(12) United States Patent
Delfino et al.

(10) Patent No.: US 11,298,920 B2
(45) Date of Patent: *Apr. 12, 2022

(54) SILICONE RUBBER AND FIBER-RESIN COMPOSITE-BASED LAMINATED PRODUCT

(71) Applicant: COMPAGNIE GENERALE DES ETABLISSEMENTS MICHELIN, Clermont-Ferrand (FR)

(72) Inventors: Antonio Delfino, Clermont-Ferrand (FR); Philippe Berguerand, Clermont-Ferrand (FR); François Pozo, Clermont-Ferrand (FR); Pascal Schroeter, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 260 days.

This patent is subject to a terminal disclaimer.

(21) Appl. No.: 16/337,191

(22) PCT Filed: Sep. 25, 2017

(86) PCT No.: PCT/FR2017/052562
§ 371 (c)(1),
(2) Date: Mar. 27, 2019

(87) PCT Pub. No.: WO2018/060577
PCT Pub. Date: Apr. 5, 2018

(65) Prior Publication Data
US 2019/0224950 A1  Jul. 25, 2019

(30) Foreign Application Priority Data
Sep. 27, 2016 (FR) .................... 1659063

(51) Int. Cl.
*B32B 25/08* (2006.01)
*B32B 7/12* (2006.01)
(Continued)

(52) U.S. Cl.
CPC ............ *B32B 25/08* (2013.01); *B32B 5/02* (2013.01); *B32B 7/12* (2013.01); *B32B 17/04* (2013.01);
(Continued)

(58) Field of Classification Search
CPC .......... B60C 7/00; B60C 7/102; B32B 25/08; B32B 25/20; B32B 2260/021;
(Continued)

(56) References Cited

U.S. PATENT DOCUMENTS 2,827,099 A   3/1958  Youngs
3,445,420 A   5/1969  Kookootsedes
(Continued)

FOREIGN PATENT DOCUMENTS

CN   104148580 A   11/2014
EP    1174250 B1    1/2002
(Continued)

OTHER PUBLICATIONS

Zhang, Haibing, "The Permeability Characteristics of Silicone Rubber", 2006 SAMPE Fall Technical Conference, "Global Advances in Materials and Process Engineering", proceedings, Coatings and Sealants Section; https://imageserv5.team-logic.com/mediaLibrary/99/D116_20Haibing_20Zhang_20et_20al.pdf (Year: 2006).*

(Continued)

*Primary Examiner* — Jasper Saberi
(74) *Attorney, Agent, or Firm* — Venable LLP (57) ABSTRACT

A laminated product (10) comprises at least: a layer (1) of silicone rubber, in particular of the high temperature crosslinking type, such as, for example, a silicone rubber of VMQ (Continued)

or PVMQ grade the said layer (1) of silicone rubber being sandwiched between two layers (2) of fibre-resin composite comprising filaments (3) of an inorganic substance (4), in particular glass, embedded in a thermoset resin (5), such as, for example, a vinyl ester resin. The silicone layer has a thickness, denoted $T_1$, of between 1.5 and 3 times the thickness $T_2$ of each layer of fibre-resin composite, which is between 0.25 and 2 mm. Such a laminate may be used in the manufacture of a finished article, in particular of a non-pneumatic wheel or tire.

32 Claims, 4 Drawing Sheets

(51) Int. Cl.
| | |
|---|---|
| *B32B 25/20* | (2006.01) |
| *B60B 9/00* | (2006.01) |
| *B60C 7/00* | (2006.01) |
| *B32B 27/42* | (2006.01) |
| *B32B 27/36* | (2006.01) |
| *B32B 27/28* | (2006.01) |
| *B32B 27/38* | (2006.01) |
| *B32B 5/02* | (2006.01) |
| *B32B 17/04* | (2006.01) |
| *B32B 25/10* | (2006.01) |
| *B32B 27/12* | (2006.01) |
| *B32B 25/02* | (2006.01) |
| *B60B 9/26* | (2006.01) |

(52) U.S. Cl.
CPC .............. *B32B 25/02* (2013.01); *B32B 25/10* (2013.01); *B32B 25/20* (2013.01); *B32B 27/12* (2013.01); *B32B 27/28* (2013.01); *B32B 27/283* (2013.01); *B32B 27/36* (2013.01); *B32B 27/38* (2013.01); *B32B 27/42* (2013.01); *B60B 9/00* (2013.01); *B60C 7/00* (2013.01); *B32B 2250/03* (2013.01); *B32B 2250/40* (2013.01); *B32B 2260/021* (2013.01); *B32B 2260/023* (2013.01); *B32B 2260/046* (2013.01); *B32B 2262/10* (2013.01); *B32B 2262/101* (2013.01); *B32B 2307/30* (2013.01); *B32B 2307/50* (2013.01); *B32B 2307/54* (2013.01); *B32B 2307/732* (2013.01); *B32B 2605/00* (2013.01); *B60B 9/26* (2013.01)

(58) Field of Classification Search
CPC .......... B32B 2260/023; B32B 2250/40; B32B 17/04; B32B 27/283; B32B 25/10; B32B 2307/54; B32B 7/12
See application file for complete search history.

(56) References Cited

U.S. PATENT DOCUMENTS

| | | | |
|---|---|---|---|
| 4,347,346 A | 8/1982 | Eckberg | |
| 4,960,633 A | 10/1990 | Hiza et al. | |
| 5,368,916 A * | 11/1994 | Fujimoto | B32B 27/08 428/215 |
| 6,460,586 B1 * | 10/2002 | Spragg | B60C 9/18 152/516 |
| 6,640,859 B1 | 11/2003 | Laurent et al. | |
| 6,769,465 B2 | 8/2004 | Rhyne et al. | |
| 6,926,853 B2 | 8/2005 | Hinc et al. | |
| 6,994,135 B2 | 2/2006 | Delfino et al. | |
| 7,032,634 B2 | 4/2006 | Laurent et al. | |
| 7,201,194 B2 | 4/2007 | Rhyne et al. | |
| 7,484,949 B2 | 2/2009 | Hinc et al. | |
| 8,491,981 B2 | 7/2013 | Delfino et al. | |
| 8,517,068 B2 | 8/2013 | Delfino et al. | |
| 8,585,947 B2 | 11/2013 | Meraldi et al. | |
| 8,883,283 B2 | 11/2014 | Delfino et al. | |
| 8,960,248 B2 | 2/2015 | Cron et al. | |
| 8,962,120 B2 | 2/2015 | Delfino et al. | |
| 9,493,045 B2 | 11/2016 | Cron et al. | |
| 9,902,212 B2 | 2/2018 | Bucher et al. | |
| 10,105,989 B2 | 10/2018 | Cron et al. | |
| 10,226,967 B2 | 3/2019 | Sugiya et al. | |
| 10,259,266 B2 | 4/2019 | Delfino | |
| 10,300,742 B2 | 5/2019 | Iwamura et al. | |
| 10,350,944 B2 | 7/2019 | Vilcot | |
| 2003/0015827 A1 | 1/2003 | Hinc et al. | |
| 2003/0121581 A1 | 7/2003 | Thompson et al. | |
| 2003/0213541 A1 | 11/2003 | Laurent et al. | |
| 2003/0226630 A1 | 12/2003 | Delfino et al. | |
| 2005/0173823 A1 | 8/2005 | Hinc et al. | |
| 2007/0267116 A1 | 11/2007 | Rhyne et al. | |
| 2009/0022921 A1 | 1/2009 | Meraldi et al. | |
| 2010/0018621 A1 * | 1/2010 | Thompsom | B60C 7/22 152/302 |
| 2010/0022694 A1 * | 1/2010 | Meyer | C09C 1/3081 524/430 |
| 2010/0260967 A1 | 10/2010 | Delfino et al. | |
| 2010/0307653 A1 | 12/2010 | Delfino et al. | |
| 2011/0027584 A1 * | 2/2011 | Zhong | B32B 17/10798 428/355 R |
| 2011/0104428 A1 | 5/2011 | Delfino et al. | |
| 2011/0260525 A1 | 10/2011 | Delfino et al. | |
| 2012/0216932 A1 | 8/2012 | Cron et al. | |
| 2012/0225318 A1 * | 9/2012 | Inoue | D07B 1/0666 428/630 |
| 2014/0272277 A1 * | 9/2014 | Schaedler | B32B 7/02 428/116 |
| 2014/0326374 A1 | 11/2014 | Cron et al. | |
| 2015/0018495 A1 * | 1/2015 | Fukushima | C08G 69/40 525/420 |
| 2015/0068691 A1 | 3/2015 | Thomas et al. | |
| 2015/0122385 A1 | 5/2015 | Cron et al. | |
| 2015/0174968 A1 | 6/2015 | Huyghe et al. | |
| 2016/0159152 A1 * | 6/2016 | Delfino | B60C 9/2003 152/310 |
| 2016/0185051 A1 | 6/2016 | Delfino et al. | |
| 2016/0257170 A1 | 9/2016 | Sugiya et al. | |
| 2016/0318342 A1 | 11/2016 | Delfino | |
| 2018/0009264 A1 | 1/2018 | Delfino | |
| 2018/0170109 A1 | 6/2018 | Delfino | |
| 2019/0054767 A1 | 2/2019 | Cron et al. | |
| 2019/0104358 A1 * | 4/2019 | Tadokoro | B32B 25/02 |
| 2019/0217665 A1 | 7/2019 | Delfino et al. | |

FOREIGN PATENT DOCUMENTS

| | | |
|---|---|---|
| EP | 1242254 A1 | 9/2002 |
| EP | 1359028 A1 | 11/2003 |
| EP | 2 848 401 A2 | 3/2015 |
| EP | 3064371 A1 | 9/2016 |
| JP | 5-301297 A | 11/1993 |
| WO | 00/37269 A1 | 6/2000 |
| WO | 2007/085414 A1 | 8/2007 |
| WO | 2009/033619 A1 | 3/2009 |
| WO | 2009/033620 A1 | 3/2009 |
| WO | 2009/115254 A1 | 9/2009 |
| WO | 2009/135561 A2 | 11/2009 |
| WO | 2011/046553 A1 | 4/2011 |
| WO | 2013/095499 A1 | 6/2013 |

OTHER PUBLICATIONS

"Strength and Stiffness Characteristics", 2003, https://www.ae.msstate.edu/vlsm/materials/strength_chars/secant.htm (Year: 2003).*
P. Jerschow, "Silicone Elastomers", Rapra Review Reports, Report 137, vol. 12, No. 5, 2001 (ISBN: 1-85957-297-9).
International Search Report dated Dec. 12, 2017, in corresponding PCT/FR2017/052562 (6 pages).

* cited by examiner

SILICONE RUBBER AND FIBER-RESIN COMPOSITE-BASED LAMINATED PRODUCT

1. FIELD OF THE INVENTION

The present invention relates to laminated products, that is to say to products made of several layers of planar or non-planar shape which are connected together.

The invention more specifically relates to laminated products, the specific construction of which makes it possible to obtain a deformable structure which can be used as beam resistant to flexural/compressive strains, these laminated products being in particular composites consisting, at least in part, of fibres coated in a resin matrix.

The invention also relates to elastic (flexible) tyres or wheels for motor vehicles of the "non-pneumatic" type, that is to say not requiring an inflation gas, such as air, to assume their usable shape.

2. STATE OF THE ART

Elastic or flexible non-pneumatic tyres or wheels, that is to say tyres or wheels capable of deforming under a given stress and of returning to their initial shape once released from this stress, are well known to a person skilled in the art. They have been described in a great many patent documents, for example in Patents or Patent Applications EP 1 242 254 (or U.S. Pat. No. 6,769,465), EP 1 359 028 (or U.S. Pat. No. 6,994,135), U.S. Pat. No. 7,201,194, WO 00/37269 (or U.S. Pat. No. 6,640,859), WO 2007/085414 (or U.S. Pat. No. 8,585,947).

Such non-pneumatic tyres, when they are combined with any rigid mechanical element intended to provide the connection between the flexible tyre and the hub of a wheel, replace the assembly consisting of the pneumatic tyre, the rim and the disc, as they are known on the majority of current road vehicles.

In particular, the abovementioned patent U.S. Pat. No. 7,201,194 describes a structurally supported (i.e., without internal pressure) non-pneumatic tyre which has the essential characteristic of comprising an annular reinforcing band which supports the load on the tyre and a plurality of supporting elements or spokes, having a very low compressive stiffness, which operate in tension in order to transmit the strains between the annular band and the hub of the wheel.

This annular band (also known as shear band or beam) comprises two membranes formed of essentially inextensible cords, coated with natural or synthetic diene rubber, separated by a shear layer itself made of diene rubber. The operating principle of such a band is that the shear modulus of the shear layer is very markedly lower than the longitudinal tensile modulus of the two membranes, while being sufficient to be able to correctly transmit the strains from one membrane to the other and to thus cause the said shear band to function.

By virtue of this annular band, it is possible to manufacture non-pneumatic tyres or wheels capable of rolling under severe or aggressive conditions without any risk of puncture and without the disadvantage of having to maintain an air pressure inside the tyre.

In addition, in comparison with the non-pneumatic tyres of the prior art, a ground contact pressure in this instance is obtained which is more uniformly distributed, resulting in better working of the tyre, an improved road hold and an improved wear resistance.

However, such a rubber shear band is not without disadvantages.

First of all, at the normal temperatures of use, for example between −30° C. and +40° C., it is relatively hysteretic, that is to say that a portion of the energy provided for the rolling is dissipated (lost) in the form of heat. Subsequently, for in particular lower temperatures of use, such as those which may be found, for example, in geographical regions of polar type, typically below −50° C., indeed even lower, it is well known that a diene rubber, such as natural rubber, rapidly becomes weak and brittle and thus unusable. Under such extreme conditions, it is understood, moreover, that more or less large and rapid fluctuations in temperature, combined, for example, with relatively high mechanical stresses, can also cause problems of adhesion between the two membranes and the shear layer, with a risk of localized buckling of the shear band at the membranes and an endurance in the end which is degraded.

Patent Applications WO 2009/033619, WO 2009/033620, WO 2009/115254 and WO 2009/135561, filed by the Applicant Companies, have provided laminated products which are completely devoid of diene rubber, which can be used as shear band in non-pneumatic tyres or wheels as described above, which made it possible to overcome the abovementioned disadvantages.

These laminates are characterized in particular by a shear layer which consists of cellular structures formed of deformable cylinders made of fibre-resin composite which have proved to be capable of generating a deformation comparable to shearing between its two membranes under the action of various tensile, flexural or compressive stresses, all this within very broad temperature ranges which can typically vary from −250° C. to +150° C.

Even if they have shown a high effectiveness, these laminates exhibit, however, the disadvantage of being relatively complex to manufacture and thus of having a high cost price, so much so that it was desirable to find an alternative which is less expensive and at least as effective, in particular for temperatures of use as broad as those indicated above.

On continuing their research studies, the Applicant Companies have found a new laminated product which meets such an objective.

3. BRIEF DESCRIPTION OF THE INVENTION

According to a first subject-matter, the present invention relates to a laminated product which can be used in particular as shear band in non-pneumatic tyres or wheels as described in the introduction to the present statement, characterized in that it comprises at least one layer of silicone rubber sandwiched between two layers of fibre-resin composite comprising filaments of an inorganic substance embedded in a thermoset resin, in which the silicone layer has a thickness, denoted $T_1$, of between 1.5 and 3 times the thickness, denoted $T_2$, of each layer of fibre-resin composite, which is between 0.25 and 2 mm.

The invention relates to the above laminate both in the raw state and in the cured state, that is to say a laminate in which the silicone rubber is itself either in the non-crosslinked (raw) state or in the crosslinked (cured) state.

The invention also relates to the use of such a laminate as building element of any finished article, and also to any finished article comprising such a laminate.

It relates in particular to the use of such a laminate as reinforcing element of a non-pneumatic tyre or wheel, more particularly as shear band of such a tyre or of such a wheel, and also to such a non-pneumatic tyre or wheel.

Advantageously, the laminate of the invention, compared with the above laminates of the prior art, has proved in addition to contribute an at least equivalent stiffness to this shear band while conferring greater flexibility on the structure of the wheel, thus making it possible for it to take impacts better and absorb obstacles better.

BRIEF DESCRIPTION OF THE FIGURES

The invention and its advantages will be readily understood in the light of the detailed description and exemplary embodiments which follow, and also of the figures relating to these examples which diagrammatically represent (without being true to scale):
- in cross-section, an example of laminate (10) according to the invention, having a rectangular cross-section, oriented along a longitudinal main direction X, comprising a total of 3 layers, a layer (1) of silicone rubber and two layers (2) of fibre-resin composite (FIG. 1);
- a view in slight perspective of a cross-section of another example of laminate (20) according to the invention, having a rectangular cross-section, oriented along the longitudinal main direction X, comprising a total of 5 layers, two layers (1a, 1b) of silicone rubber and three layers (2a, 2b, 2c) of fibre-resin composite (FIG. 2);
- a complete view in perspective of an example of non-pneumatic elastic wheel (30) comprising an example of laminate (20, 32) according to the invention (FIG. 3);
- a view in radial section of an individual element (40) of the above wheel (30), describing in detail a wheel spoke (34) and means for fixing (35a, 35b) this spoke (34) on the one hand to the hub (31) of the wheel and on the other hand to the laminate (20, 32) according to the invention, the latter being itself surmounted radially by a tread (33), for example made of stainless steel (FIG. 4).

4. DEFINITIONS

In the present patent application, unless expressly indicated otherwise, all the percentages (%) shown are percentages by weight.

The expression "x and/or y" means "x" or "y" or both (that is to say, "x and y"). Any interval of values denoted by the expression "between a and b" represents the range of values extending from more than a to less than b (that is to say, limits a and b excluded), whereas any range of values denoted by the expression "from a to b" means the range of values extending from a up to b (that is to say, including the strict limits a and b).

Moreover, in the present patent application:
- "composite", when speaking of any material or object, is understood to mean a material or object comprising short or continuous fibres which are coated in a resin matrix;
- "layer" is understood to mean a sheet or any other element of relatively low thickness, in comparison with its other dimensions, it being possible for this layer to be or not to be homogeneous or cohesive in nature, with a planar or non-planar shape;
- "axial direction", when speaking of a wheel (or tyre), is understood to mean a direction which is substantially parallel to the axis of rotation of the wheel, that is to say forming, with this direction, an angle not deviating by more than 10°, preferably not by more than 5°;
- "circumferential direction", when speaking of a wheel (or tyre), is understood to mean a direction which is substantially perpendicular both to the axial direction and to a spoke of the wheel (in other words, tangent to a circle, the centre of which is on the axis of rotation of the wheel), that is to say forming, with this direction, an angle not deviating by more than 10°, preferably not by more than 5°;
- "radial direction", when speaking of a wheel (or tyre), is understood to mean a direction along a spoke of the wheel, that is to say any direction which passes through the axis of rotation of the wheel and substantially perpendicular to this direction, that is to say forming, with a perpendicular to this direction, an angle not deviating by more than 10°, preferably not by more than 5°;
- "unidirectional fibres" is understood to mean an assembly of fibres which are essentially parallel to one another, that is to say oriented along one and the same axis;
- "non-pneumatic", when speaking of a wheel or of a tyre, is understood to mean a wheel or a tyre designed in order to be capable of bearing a substantial load without inflation pressure, that is to say not requiring an inflation gas, such as air, in order to assume its usable shape and to support the load;
- "oriented along an axis or a direction", when speaking of any one element, such as a band, a fibre or other slender reinforcing element, is understood to mean an element which is oriented substantially parallel to this axis or this direction, that is to say forming, with this axis or this direction, an angle which does not deviate by more than 10° (that is to say, zero or at most equal to 10°), preferably not by more than 5°;
- "oriented perpendicularly to an axis or a direction", when speaking of any one element, such as a band, a fibre or other slender reinforcing element, is understood to mean an element which is oriented substantially perpendicularly to this axis or this direction, that is to say forming, with a line perpendicular to this axis or this direction, an angle which does not deviate by more than 10°, preferably not by more than 5°;
- "oriented radially", when speaking of a wheel (or tyre) element, is understood to mean oriented substantially parallel to the radial direction of the wheel (or of the tyre), that is to say forming, with this direction, an angle not deviating by more than 10°, preferably not by more than 5';
- "oriented circumferentially", when speaking of a wheel (or tyre) element, is understood to mean oriented substantially parallel to the circumferential direction of the wheel (or of the tyre), that is to say forming, with this direction, an angle not deviating by more than 10°, preferably not by more than 5°;
- "laminate" or "laminated product", within the meaning of the International Patent Classification, is understood to mean any product comprising at least two layers, of planar or non-planar shape, which are joined or connected together; the expression "joined" or "connected" should be interpreted broadly so as to include all means of joining or assembling, for example by bonding, nailing, riveting or bolting.

5. DETAILED DESCRIPTION OF THE INVENTION

A first subject-matter of the present invention is thus a laminate (by definition multilayer) comprising at least one layer of silicone rubber sandwiched between two layers of fibre-resin composite comprising filaments of an inorganic substance embedded in a thermoset resin, in which the silicone layer has a thickness, denoted $T_1$, of between 1.5 and 3 times the thickness, denoted $T_2$, of each layer of fibre-resin composite, which is for its part between 0.25 and 2 mm.

Figure 1:
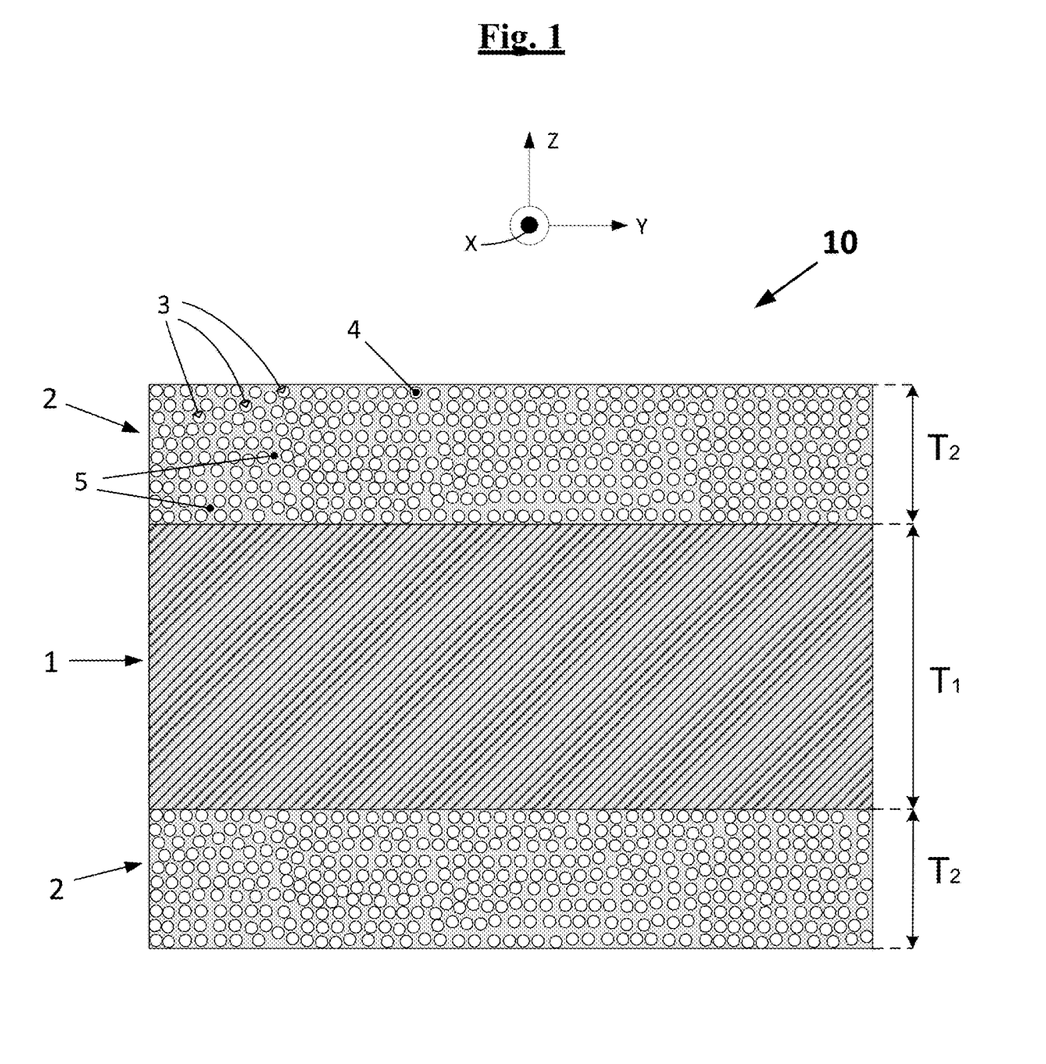

FIG. 1 illustrates, very simply and diagrammatically, an example of laminate (10) according to the invention, defining at least three main perpendicular directions, a longitudinal (that is to say, along the length) or circumferential (in the case of a non-planar laminate which is a constituent, for example, of a non-pneumatic wheel) direction (X), a transverse (that is to say, across the width) or axial (in the case of a non-planar laminate which is a constituent, for example, of a non-pneumatic wheel) direction (Y), and finally a radial direction (Z) across the thickness, the said composite comprising at least:

- a layer (1) of silicone rubber (synonym elastomer);
- the said layer of silicone rubber (1) being sandwiched between two layers (2) of fibre-resin composite comprising filaments (3) of an inorganic substance (4) embedded in a thermoset resin (5);
- the silicone layer (1) has a thickness, denoted $T_1$, of between 1.5 and 3 times the thickness, denoted $T_2$, of each layer (2) of fibre-resin composite, which is between 0.25 and 2 mm.

These (at least) 3 layers or bands are, of course, all three oriented along the same main direction (X) of the laminate (10) which is a subject-matter of the invention. The main direction X can be rectilinear (as represented in FIG. 1) or non-rectilinear, for example can follow a curved line, as represented, for example, in FIG. 3, which will be commented on subsequently.

In the laminate of the invention capable of fulfilling, incorporated, for example, in a non-pneumatic tyre or wheel, the role of shear band described in the introduction to the present statement, it will be easily understood that the layer of silicone rubber fulfils the role of shear layer, whereas the two layers of fibre-resin composite play the role of membranes (sometimes known as "soles" by a person skilled in the art in the field of composite laminates).

When several layers (and not just one) of silicone rubber are present in the laminate of the invention, the first essential characteristic of the invention is clearly that at least one of these layers is sandwiched between two layers of fibre-resin composite. According to the specific embodiments of the invention, the other layers of silicon rubber can be in (adhesive or non-adhesive) contact with one or more other layer(s) of the fibre-resin composite, or in (adhesive or non-adhesive) contact with any other substance, for example with a metal or with a polymer other than those described above.

According to an essential embodiment of the invention, the (at least one) silicone layer (1) has a thickness, denoted $T_1$, which is greater than the thickness, denoted $T_2$, of each layer (2) of fibre-resin composite, $T_1$ being in addition between 1.5 and 3 times $T_2$, and $T_2$ between 0.25 and 2 mm. All these thicknesses are, of course, measured along the Z direction.

More preferably, this thickness $T_1$ is between 1 and 3 mm, in particular between 1.5 and 2.5 mm.

According to another preferred embodiment of the invention, each layer of fibre-resin composite has a thickness $T_2$ of between 0.5 and 1.5 mm.

Figure 2:
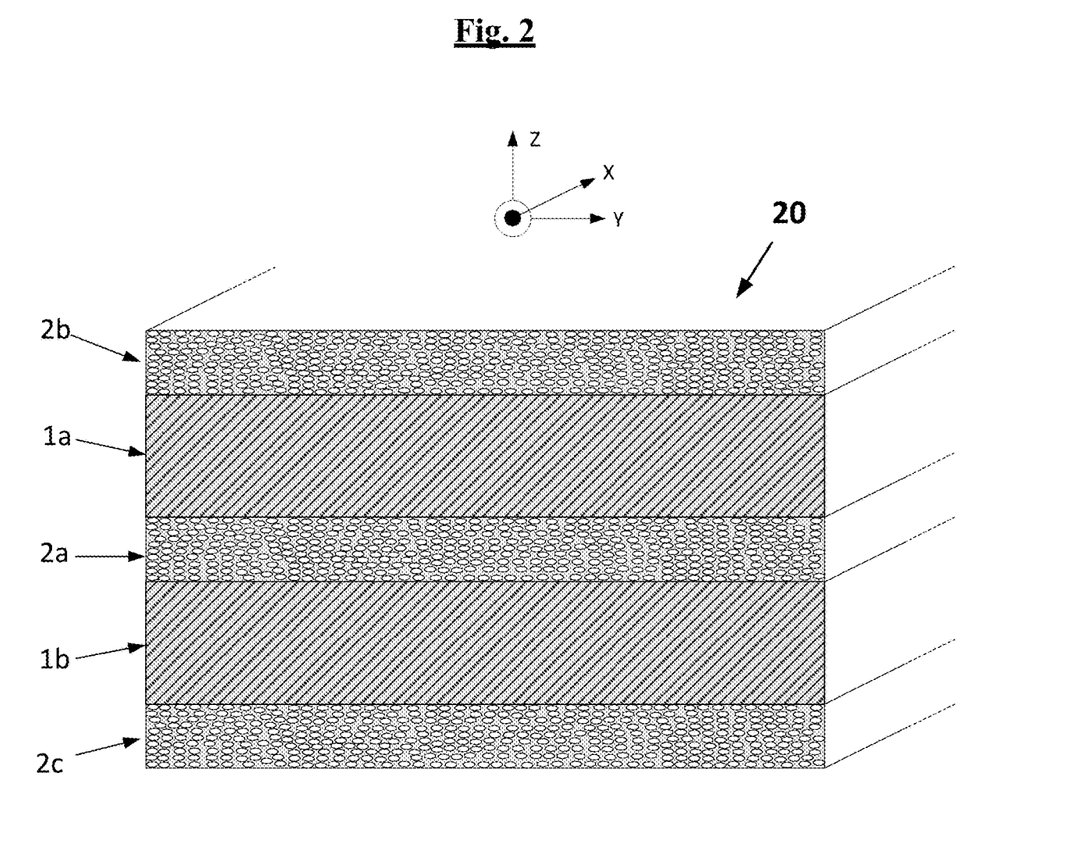

According to a specific embodiment of the invention, the laminate of the invention comprises at least two (that is to say, two or more than two) layers (1a, 1b) of silicone rubber and at least three (that is to say, three or more than three) layers (2a, 2b, 2c) of fibre-resin composite, as illustrated, for example, in FIG. 2, which will be commented on subsequently.

The layers (2; 2a, 2b, 2c) of composite can have the same thickness $T_2$ from one layer to the other, or a different thickness. Likewise, the layers (1; 1a, 1b) of silicone rubber, if there are several of them, can have the same thickness $T_1$ from one layer to the other, or a different thickness.

Preferably, the layer(s) of silicone rubber (1; 1a, 1b) and the layers of fibre-resin composite (2; 2a, 2b, 2c) are joined together by at least one adhesion primer. This adhesion primer is preferably based on an organosilane or on an organopolysiloxane.

"Silicone rubber" is understood to mean, in the present patent application, a (just one or several is meant) silicone elastomer as is (used alone) and also, preferably, a rubber composition based on such a silicone elastomer and on at least one additive, such as, for example, a peroxide crosslinking system or a platinum catalyst, it being possible for this elastomer or this composition to be in the non-crosslinked (raw) or else crosslinked (cured) state.

The expression composition "based on" should be understood, in a known way, as meaning a composition comprising the mixture and/or the reaction product of the various constituents used, some of these base constituents being capable of reacting, or intended to react, with one another, at least in part, during the various phases of manufacture of the laminate of the invention, in particular during the crosslinking or vulcanization thereof.

It will be recollected here that a silicone elastomer (or equivalently polysiloxane elastomer) is an elastomer resulting, at least in part (i.e., a homopolymer or a copolymer), from siloxane monomers (monomers of general formula $R_2SiO$). Thus, silicone elastomers comprise the elements silicon and oxygen, and groups, for example organic groups, attached to the silicon. The organic groups R can, in a known way, be groups such as hydrogen atoms, halogens, alkoxy groups, alkyl (in particular methyl) groups or aryl (in particular phenyl) groups.

The nomenclature classifies silicone elastomers or rubbers (or also elastomeric silicones) according to their curing conditions. They are divided into two categories: Room Temperature Vulcanizing (RTV) elastomers and High Temperature Vulcanizing (HTV) elastomers. The RTVs have the ability to crosslink at ambient temperature (that is to say, at a temperature of between 5° C. and 35° C.) and the HTVs crosslink at temperatures of greater than 80° C. (and in particular at a temperature of between 100° C. and 230° C.).

Given these definitions, the silicone rubber used in the laminate according to the invention is preferably a silicone rubber of the HTV type.

Within this HTV class, silicones are also differentiated by their viscosity or their molecular weight, given in number of $SiO_2$ monomer units, as shown, for example, in Table 18, page 25, of the work "Silicone Elastomers" by P. Jerschow, Report 137, Volume 12, Number 5, 2001 (ISBN: 1-85957-297-9).

High consistency rubber (HCR), according to this latter reference, generally has a viscosity of greater than 20 000 Pa·s, which corresponds, according to the author, to a molecular weight of greater than 6000 $SiO_2$ units. Liquid Rubber (LR) or Liquid Silicone Rubber (LSR), according to this same reference, generally has a viscosity of less than 100 Pa·s, which corresponds to a molecular weight of less than 1000 $SiO_2$ units.

To sum up, the silicone rubber used in the laminate of the invention is thus preferably of the HTV (high temperature vulcanizing) type and more preferably, among HTV silicones, an HCR silicone rubber (having a high viscosity).

Such silicone rubbers are well known; their fields of application are highly varied, for example the cable industry, the food industry, the medical field, the aeronautical industry and the aerospace industry. Mention may be made, as commercially available products, for example for the group of the HCRs, of: Elastosil R with, for example, Elastosil R 701-60 or Elastosil R 701-80 from Wacker; Bluesil, Silbione, Rhodorsil with, for example, Rhodorsil MF660U or Rhodorsil MM 60 THT from Bluestar; Silastic from Dow Corning; Tufel, Addisil, Silplus from Momentive.

Moreover, the silicone rubber used is preferably of grade (or quality Q): MQ, FMQ, PMQ, VMQ, PVMQ or FVMQ, according to a classification well known to a person skilled in the art (see in particular Standard ASTM D1418). In such a classification, as a reminder, M denotes the methyl group, F denotes the trifluoropropyl group, P denotes the phenyl group and V denotes the vinyl group. PVMQ, for example, denotes silicone rubbers comprising phenyl, vinyl and methyl groups.

More preferably, the silicone rubber used is of VMQ or PVMQ grade, very particularly of PVMQ grade. Mention may be made, as commercially available product, for example for the PVMQ grade, of the silicone rubber KE-183-U from ShinEtsu which is resistant to low temperature and crosslinkable with peroxide.

The silicone rubber composition can comprise just one silicone elastomer or a mixture of several silicone elastomers, it being possible for the silicone elastomer or elastomers to be used optionally in combination with another type of elastomer.

However, preferably, the silicone rubber composition of the laminate of the invention comprises more than 50 phr, more preferably more than 80 phr, of silicone elastomer, it being possible for the elastomer remainder (consequently preferably less than 50 phr, more preferably still less than 20 phr) to consist optionally of another type of elastomer. According to a particularly preferred embodiment, the silicone elastomer constitutes the only elastomer present in this composition, that is to say that its content is equal to 100 phr.

The expression "part by weight per hundred parts by weight of elastomer" (or phr) should be understood as meaning, within the meaning of the present invention, the portion by weight per hundred parts of elastomer, whatever the nature of the elastomer.

Preferably, the silicone rubber composition of the laminate of the invention comprises a system for crosslinking the silicone elastomer more preferably chosen from the group consisting of organic peroxides and their mixtures.

For example and nonlimitingly, the organic peroxides can be selected from the group of the following peroxides: bis(2,4-dichlorobenzoyl) peroxide or DCBP-50 (Perkadox PD-50S-ps-a from Akzo Nobel Chemical B.V. or Luperox CST from Arkema), benzoyl peroxide or BP-50 (Perkadox L-50S-ps from Akzo Nobel Chemical B.V.), dicumyl peroxide (Di-Cup 40C from Geo Specialty Chemicals Inc. or Varox DCP-40C from R.T. Vanderbilt Company Inc.), 2,5-dimethyl-2,5-di(t-butylperoxy)hexane or DBPH (Varox DBPH-50 from R.T. Vanderbilt Company Inc. or Luperox 101 from Arkema or Trigonox 101 from Akzo Nobel Chemical B.V). The crosslinking system is more particularly still chosen from organic peroxides and more preferably 2,5-dimethyl-2,5-di(t-butylperoxy)hexane or DBPH.

The silicone rubber composition of the laminate of the invention can also comprise other optional additives. Such an additive can, for example, be a filler, in particular of the silica type; use may be made, as specific examples, of a fumed silica or a precipitated silica.

Mention may also be made, as other possible additives, of carbon black, zinc oxide, colouring agents or protective agents, such as antiozonants or antioxidants.

The silicone rubbers used in accordance with the invention can contain inhibitors of the crosslinking reaction, for example inhibitors of the platinum catalyst, such as, for example, organic amines, silazanes, organic oximes, dicarboxylic acid diesters, acetylenic alcohols, acetylenic ketones or vinylmethylcyclopolysiloxanes (see, for example, U.S. Pat. Nos. 3,445,420 and 528,966). The inhibitor is used, for example, in a proportion of 0.005 to 5 phr, preferably of 0.01 to 3 phr.

Preferably, the silicone rubber composition exhibits, after crosslinking, an apparent secant tensile modulus at 10% elongation, denoted ASM10, which is less than 5 MPa, more preferably between 1 and 5 MPa, in particular between 1 and 3 MPa. Its tensile elongation at break, denoted Et, is preferably greater than 350%, more preferably greater than 400%, in particular greater than 450%. Unless otherwise indicated, these mechanical properties are measured according to Standard NF-T-46-002 (September 1988). All these tensile measurements are carried out under the standard conditions of temperature (23±2° C.) and hygrometry (50±5% relative humidity), according to French Standard NF-T-40-101 (December 1979).

Fibre-resin composite material is understood to mean, in a known way, a material comprising fibres embedded (or coated, the two being regarded as synonyms) in a resin matrix.

The fibres of the laminate of the invention can be continuous fibres or short fibres; it is preferable to use continuous fibres. For a better resistance of the layers, these fibres are preferably substantially unidirectional and oriented along the main direction X. In this direction X, the layers of glass-resin composite exhibit a tensile modulus (ASTM D 638) which is preferably greater than 15 GPa, more preferably greater than 30 GPa (for example, between 30 and 50 GPa).

Use is preferably made of multifilament fibres, that is to say each consisting of several unitary filaments with a small individual diameter, but use might also be made of monofilament fibres, that is to say fibres each consisting of a unitary monofilament comparatively of greater diameter.

More preferably, the individual filaments of these fibres are inclined, with respect to the fibre axis and thus to the main direction X, by an angle alpha which is less than or equal to 45°, more preferably less than or equal to 15°; more preferably still, the filaments of inorganic substance are themselves oriented along the main axis X of the laminate (zero angle alpha).

In the laminate of the invention, the layers of fibre-resin composite can consist of just one filament stack or of several superimposed individual filament stacks, the fibres of which are preferably all oriented along the main direction X. One or more additional stacks of cross threads can be inserted into this multistack structure, in order to reinforce the structure laterally and thus, according to a term recognised in the field of composites, to balance the overall structure.

Typically, the filaments of inorganic substance (3) are thus present in the form of multifilament fibres (which are preferably essentially unidirectional), it being possible for each multifilament fibre to comprise several tens, hundreds, indeed even thousands, of unitary filaments. These very fine unitary filaments generally and preferably, in particular when they are made of glass, have a mean diameter of the order of 5 to 30 μm, more preferably of 10 to 20 μm.

Preferably, the inorganic multifilament fibres are chosen from glass fibres, carbon fibres, boron fibres, ceramic fibres (encompassing oxide fibres, such as silica or alumina fibres, and non-oxide fibres, such as silicon carbide fibres) and the mixtures of such fibres.

In other words, the constituent inorganic substance (4) of the filaments of the single strands is preferably chosen from glass, carbon, boron and ceramic; more preferably, the inorganic substance is glass.

"Resin" (5) is understood to mean, in the present patent application, any synthetic resin of the thermosetting (also known as curable, polymerizable or crosslinkable) type as is (used alone) or, by extension, any composition or formulation based on this resin and additionally comprising one or more additives, such as, for example, a curing agent. "Thermoset" or "crosslinked" resin is understood to mean, of course, that the resin is cured (photocured and/or thermoset), in other words that it exists in the form of a network of three-dimensional bonds, in a state specific to "thermosetting" polymers (as opposed to "thermoplastic" polymers).

The starting resin used in this instance is thus, by definition, a crosslinkable (curable) resin capable of being crosslinked or cured by any known method, for example by UV (or UV-visible) radiation, preferably emitting in a spectrum ranging at least from 300 nm to 450 nm.

Use is preferably made, as crosslinkable resin, of a polyester or vinyl ester resin. "Polyester" resin is understood to mean, in a known way, a resin of the unsaturated polyester type. Use is more preferably made of a vinyl ester resin.

Vinyl ester resins are well known in the field of composite materials. It was found that a vinyl ester resin withstood extremely low temperatures better than the others. A simple test makes it possible to measure whether the flexural strength of a (glass fibre/vinyl ester resin) composite is substantially increased at very low temperature. This test consists in forming a loop with a composite element (for example a tape or monofilament with a thickness or diameter of 1 mm) and in decreasing the radius of curvature thereof until failure (clearly visible to the naked eye) of the exterior part of the tape or monofilament which is under tension. It is then noticed, unexpectedly, that the minimum radius achieved becomes smaller when the loop of the tape or monofilament has been immersed immediately beforehand in liquid nitrogen (−196° C.). In the test of thermal quenching or immersion in liquid nitrogen, the resin as is can also be tested, the resins which do not crack during such a test being favoured.

Without this definition being limiting, the vinyl ester resin is preferably of the epoxy vinyl ester type. Use is more preferably made of a vinyl ester resin, in particular of the epoxide type, which, at least in part, is based on novolac (also known as phenoplast) and/or bisphenol (that is to say, grafted to a structure of this type), i.e. preferably a vinyl ester resin based on novolac, bisphenol, or novolac and bisphenol.

An epoxy vinyl ester resin based on novolac (the part between brackets in the formula I below) corresponds, for example, in a known way, to the following formula (I):

An epoxy vinyl ester resin based on bisphenol A (the part between brackets of the formula (II) below) corresponds, for example, to the formula (the "A" serving as a reminder that the product is manufactured using acetone):

An epoxy vinyl ester resin of novolac and bisphenol type has shown excellent results. Mention may in particular be made, by way of example of such a resin, of the vinyl ester resins Atlac 590 and E-Nova FW 2045 from DSM (diluted with approximately 40% of styrene). Epoxy vinyl ester resins are available from other manufacturers, such as, for example, AOC (USA—Vipel resins).

Preferably, in the laminate of the invention, the initial tensile modulus of the thermoset resin, measured at 20° C., is greater than 3.0 GPa, more preferably greater than 3.5 GPa.

The impregnation resin (resin composition) preferably comprises a photoinitiator which is sensitive (reactive) to UV radiation above 300 nm, preferably between 300 and 450 nm. This photoinitiator is used at a preferred content of 0.5% to 3%, more preferably of 1% to 2.5%. The resin can also comprise a crosslinking agent, for example at a content of between 5% and 15% (% by weight of impregnation composition).

Preferably, this photoinitiator is of the family of the phosphine compounds, more preferably a bis(acyl)phosphine oxide, such as, for example bis(2,4,6-trimethylbenzoyl)phenylphosphine oxide (Irgacure 819 from BASF), or a mono(acyl)phosphine oxide (for example Esacure TPO from Lamberti), it being possible for such phosphine compounds to be used as a mixture with other photoinitiators, for example photoinitiators of alpha-hydroxy ketone type, such as, for example, dimethylhydroxyacetophenone (e.g., Esacure KL200 from Lamberti) or 1-hydroxycyclohexyl phenyl ketone (e.g., Esacure KS300 from Lamberti), benzophenones, such as 2,4,6-trimethylbenzophenone (e.g., Esacure TZT from Lamberti), and/or thioxanthone derivatives, such as, for example, isopropylthioxanthone (e.g., Esacure ITX from Lamberti).

The glass transition temperature, denoted $Tg_2$, of the thermoset resin is preferably greater than 30° C., more preferably greater than 70° C.

$Tg_1$ and $Tg_2$ are measured in a known way by DSC (Differential Scanning calorimetry), at the second pass, for example and unless otherwise indicated in the present patent application, according to Standard ASTM D3418 of 1999 (822-2 DSC apparatus from Mettler Toledo; nitrogen atmosphere; samples brought beforehand from ambient temperature (20° C.) to 250° C. (10° C./min), then rapidly cooled (quenching) down to a temperature preferably lower by at least 50° C. than the temperature Tg under consideration (for example down to 20° C.), before final recording of the DSC curve from this quenching temperature (for example 20° C.) up to 250° C., along a gradient of 10° C./min).

As preferred example, glass-resin composites which can be used for the manufacture of the laminate of the invention are well known to a person skilled in the art. They can be prepared according to known processes preferably comprising at least the following stages:

producing a rectilinear arrangement of glass fibres (filaments) and conveying this arrangement in a direction of forward progression;

in a vacuum chamber, degassing the arrangement of fibres by the action of the vacuum;

at the outlet of the vacuum chamber, after degassing, passing through an impregnation chamber under vacuum so as to impregnate the said arrangement of fibres with a thermosetting resin or thermosetting resin composition, in the liquid state, in order to obtain a pre-preg containing the glass filaments and the resin;

passing the said pre-preg through a sizing die having a section of predefined surface area and of predefined shape, in order to provide it with a band shape (preferably of rectangular cross section);

winding the band of glass-resin composite thus obtained over a former or a mould;

in a UV irradiation chamber, polymerizing the resin under the action of the UV radiation.

All the above stages (arrangement, degassing, impregnation, sizing, polymerization, winding and final curing) are stages widely known to a person skilled in the art, as well as the substances (multifilament fibres and resin compositions) used; they have been described, for example, in Applications EP-A-1 174 250 and WO 2007/085414.

It will be recollected in particular that, before any impregnation of the fibres, a stage of degassing the arrangement of fibres by the action of the vacuum is preferably carried out, in order in particular to reinforce the effectiveness of the subsequent impregnation and above all to guarantee the absence of bubbles inside the final composite.

After passing through the vacuum chamber, the glass filaments enter an impregnation chamber which is completely full of impregnation resin and thus devoid of air: it is in this meaning that this impregnation stage can be described as "impregnation under vacuum".

The "sizing" die makes it possible, by virtue of a cross section of predetermined dimensions, generally and preferably rectangular, to adjust the proportion of resin with respect to the glass fibres while providing the pre-preg with the shape and the thickness which are targeted for the final composite.

The polymerization or UV irradiation chamber subsequently has the role of polymerizing or crosslinking the resin under the action of the UV radiation. It comprises one or preferably several UV irradiators, each composed, for example, of a UV lamp with a wavelength of 200 to 600 nm.

After the stage of final polymerization with UV radiation, an as-manufactured layer (2) of fibre-resin composite as represented diagrammatically in FIG. 1, of very great length relative to its section, the unitary glass (4) filaments (3) of which are uniformly distributed throughout the volume of cured resin (5), is finally obtained.

Preferably, in the laminate of the invention, each layer of fibre-resin composite is provided with an adhesive layer facing each layer of silicone rubber with which it is in contact.

Any appropriate adhesive system can be used to make the thermoset resin of the glass-resin composite adhere to the silicone rubber. As already indicated above, use is preferably made of an adhesion primer deposited beforehand on the glass-resin composite, more preferably based on an organosilane or on an organopolysiloxane.

A person skilled in the art will easily understand that the connection between the two types of layers, in the multilayer laminate of the invention, is definitively provided during the final curing (crosslinking) of the finished article, in particular non-pneumatic tyre or wheel, for which this laminate is intended.

The laminate of the invention can be manufactured in a way entirely conventional for a person skilled in the art of (pneumatic or non-pneumatic) tyres or wheels, by simple extrusion or calendering (on an open mill) of at least one layer (or skim) of silicone rubber in the raw state, between at least two layers of fibre-resin composite which is already crosslinked (that is to say, with its resin thermoset).

The curing typically takes place in a mould under pressure, for example between 3 and 10 bars, and at a temperature of between 150° C. and 200° C., for several minutes (for example 10 min at 160° C. according to the nature of the catalyst used). A post-vulcanization (for example 4 h at 200° C.) is then carried out in an oven, for complete crosslinking of the silicone rubber composition.

6. EXEMPLARY EMBODIMENTS OF THE INVENTION

The laminate of the invention described above is a composite product consisting of elastic materials which may retain their properties over a very broad range of temperatures.

This laminate can constitute an intermediate stage in the manufacture of a finished object or article which is or which is not laminated in its final form. Its structure opens up to it a very broad range of possible applications, which for example covers general mechanics, sports and leisure, the construction industry and public works, wire, road, rail, aerial or space transportation, or the motor vehicle industry.

This composite laminate of the invention can in particular be used in non-pneumatic tyres or wheels of all types of terrestrial or non-terrestrial motor vehicles, in particular vehicles intended to confront severe or aggressive rolling conditions, under any type of temperature after an appropriate adjustment of the glass transition temperature ($Tg_1$) of the silicone rubber, in particular under extreme temperatures, such as those which might be encountered, for example, by lunar rover vehicles, heavy road transport vehicles, off-road vehicles, such as heavy agricultural vehicles or earthmoving equipment, or any other type of transportation or handling vehicle for which the use of a diene elastomer material, such as natural rubber, is not possible or not desired.

It will, for example, advantageously be able to be used at high temperature, typically between 20° C. and 200° C., both for terrestrial applications (for example work in mines) and non-terrestrial applications (for example on the moon).

It has in particular been designed for use at low temperature, typically between −100° C. and 20° C., such as may be encountered, for example, on the planet Mars. Preferably, in this case, use is made of a silicone rubber of VMQ or PVMQ grade, more preferably of the PVMQ type.

Thus, according to a specific and preferred embodiment of the invention, the silicone rubber exhibits a glass transition temperature, denoted $Tg_1$, which is less than −100° C., preferably less than −110° C. Preferably, the silicone rubber exhibits a modulus ASM10, measured at −100° C., which is less than 30 MPa (in particular between 5 and 30 MPa), more preferably less than 20 MPa (in particular between 5 and 20 MPa), more particularly still less than 10 MPa (in particular between 5 and 10 MPa). Its elongation Et, measured at −100° C., is preferably greater than 100%, more preferably greater than 150%.

Figure 3:
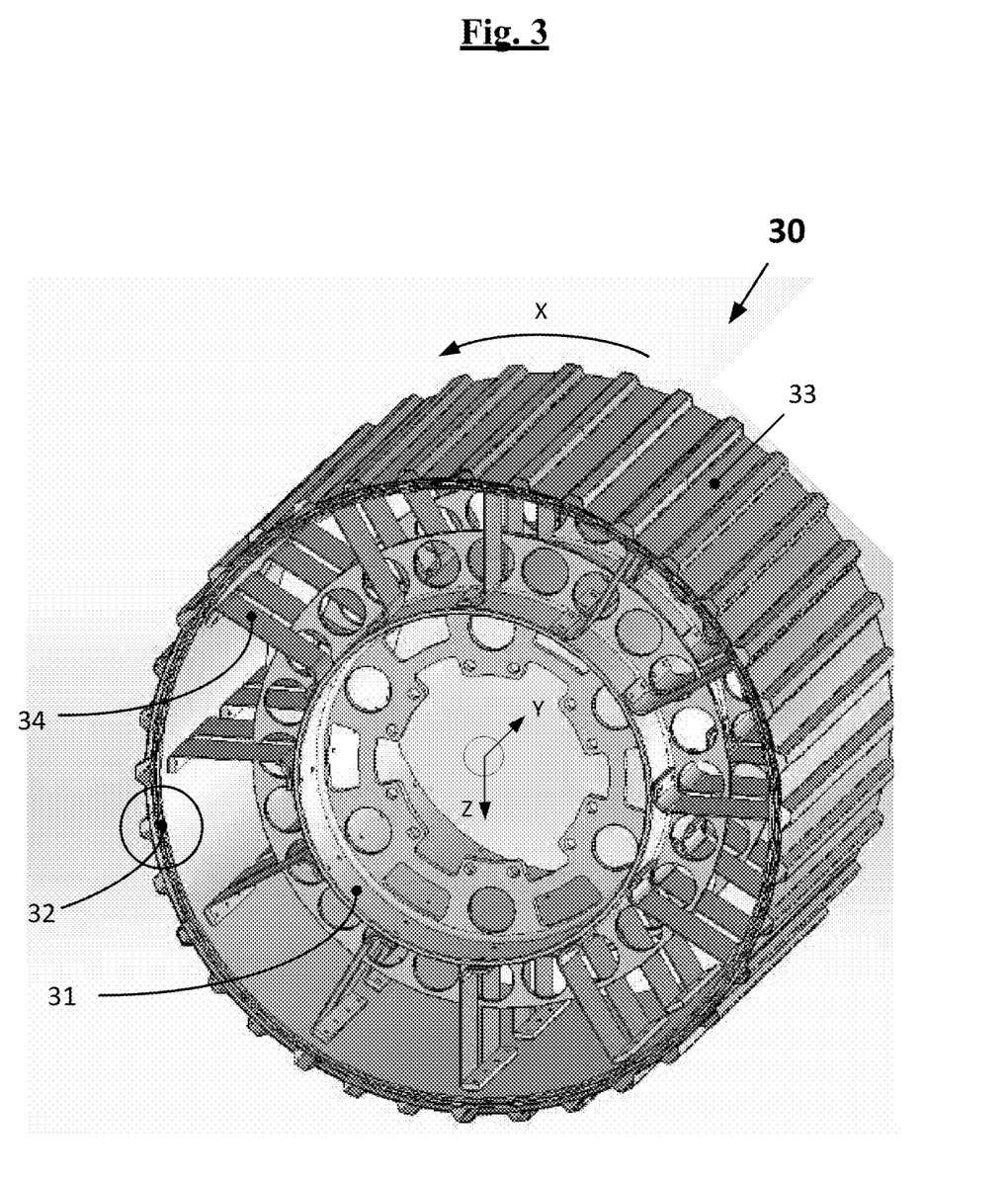

By way of example, FIG. 3 represents a complete view in perspective of an example of a non-pneumatic elastic wheel (30) which is structurally supported (i.e., by virtue of a load-bearing structure), the circumferential shear band of which consists of a laminate in accordance with the invention.

This non-pneumatic wheel (30), itself defining three perpendicular directions, circumferential (X), axial (Y) and radial (Z), comprises at least:
- a hub (31), for example metallic;
- an annular shear band (32) oriented along the circumferential direction X, surmounted by a tread (33);
- a plurality of supporting elements (34) connecting the hub (31) to the annular "shear" band (32).

The annular "shear" band (32) consists of the laminate (10, 20) in accordance with the invention described above, comprising at least one (that is to say, one or more) layer of silicone rubber sandwiched between two layers of fibre-resin composite comprising filaments of an inorganic substance embedded in a thermoset resin, in which laminate the silicone layer has a thickness, denoted $T_1$, of between 1.5 and 3 times the thickness, denoted $T_2$, of each layer of fibre-resin composite, which is between 0.25 and 2 mm.

The supporting elements (34) or "wheel spokes", having a low compressive stiffness, work in tension in order to transmit the strains between the annular shear band (32) and the hub (31) of the wheel, as described, for example, in the abovementioned U.S. Pat. No. 7,201,194 (see, for example, FIG. 7 to FIG. 11). The thickness of the spokes (34) is thin relative to that of the different layers of the laminate forming the shear band (32); it is preferably less than 0.5 mm, more preferably still less than 0.3 mm.

As a reminder, by virtue of the presence of such spokes, a uniformly distributed ground contact pressure is favoured, resulting in the wheel working better; localized points of high pressure and the risks of getting stuck in mud or sand which may accompany on unstable ground are thus avoided.

These wheel spokes (34) can be made of materials as diverse as metal (or metal alloy), polymers or also hybrid materials, which may or may not be reinforced. Mention may be made, by way of examples, of polymers, such as polyurethanes, composite materials comprising fibres, in particular glass and/or carbon fibres, impregnated or not impregnated with a resin. The tensile modulus of the materials used is, of course, suited to the load which will be supported by each wheel spoke. It is possible, by adjusting the elastic elongatability of the wheel spokes (or that of the materials constituting them), to generate a greater or lesser camber and thus to adjust the ground impression of the wheel. Thus, preferably, use is made of wheel spokes exhibiting a tensile elastic elongation of a few %, typically of 1% to 5%.

According to a preferred embodiment, in particular for use of the wheel (30) at a very low temperature, use may be made of wheel spokes which are themselves made of composite material, such as, for example, a woven fabric of glass fibres which is impregnated with PTFE (polytetrafluoroethylene), layers of continuous unidirectional glass fibres embedded in a vinyl ester resin matrix, or also a woven fabric of polyester fibres.

It is seen, in this FIG. 3, that, in accordance with a preferred embodiment, the wheel spokes (34) are oriented in a radial direction Z; they might also be arranged in a direction other than radial, for example positioned in zigzag fashion around the hub 31.

By way of example, in FIG. 3, the laminated product of the invention comprises 2 layers of silicone rubber each sandwiched between 2 layers of composite [(glass) fibres/(vinyl ester) resin], as illustrated above in FIG. 2.

It is seen, in this FIG. 3, that the laminate in accordance with the invention constituting the annular shear band (32), which is not very visible in this view, is very thin (radial thickness equal, for example, to 7 or 8 mm, measured along Z), with respect to the total diameter of the wheel (for example equal to 400 mm).

Figure 4:
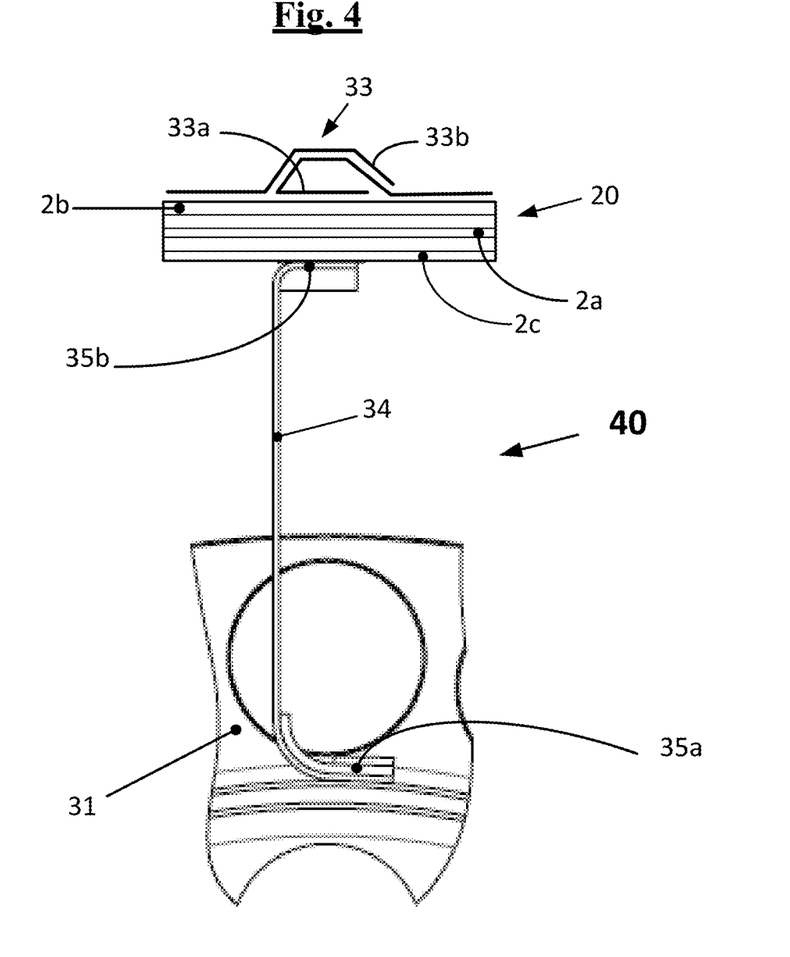

A more detailed representation is given in FIG. 4, representing a view in radial section of a unitary element (40) of the above wheel (30), describing in detail a wheel spoke (34) and means for fixing (35) this spoke (34), on the one hand, to the hub (31) of the wheel (30) and, on the other hand, to the laminate (20) according to the invention.

The latter, more precisely its radially outermost layer of glass-resin composite (for example referenced 2b in FIG. 2), is surmounted radially by the tread (33) intended to come into contact with the ground.

This tread (33) can be formed of materials as diverse as metal (or metal alloy), polymers or also metal-polymer hybrid materials. Mention may be made, as examples of polymers, for example, of polyesters, such as PET, PTFE, cellulose, such as rayon, or rubbers, such as polyurethanes.

According to a preferred embodiment, the tread is provided in the form of a three-dimensional woven fabric, in particular in the abovementioned materials, the thickness of which is, for example, between 5 and 20 mm. According to another preferred embodiment, the leather used as tread, in particular according to a thickness of a few mm (for example 3 to 4 mm), has proved to be particularly effective at very low temperature.

For use at very low temperature, preference is more particularly given to a tread made of metal, for example made of stainless steel, as illustrated, for example, in FIGS. 3 and 4, for example having a thickness of the order of 1 mm or less, so that the total thickness of the shear band plus tread assembly is preferably at most equal to 10 mm.

This tread (33) can be fixed to the shear band (32) of the wheel (30) by various fixing means, for example by riveting, bonding or bolting. According to another possible embodiment, it might be assembled directly on the laminate of the invention (10, 20) during the manufacture of the latter.

Advantageously, the tread (33) can be formed of a succession of metal elements (for example made of stainless steel) "nested" into one another, as illustrated, for example, in detail in FIG. 4. It is seen, in this FIG. 4, that the tread 33 is formed of separate elements, the end of which is in the shape of a trapezium, the end of an internal element (33a) forming a closed trapezium, the end of an external element (33b) forming an open trapezium overlapping the other end in the shape of a closed trapezium, so as to protect the shear band (laminate of the invention) and its fixing means (for example rivet) from external attack during rolling, but also to constitute a pattern (relief) for the tread capable of promoting traction of the wheel on the ground.

In this example of wheel (30) and of laminate (20) in accordance with the invention, each layer (2a, 2b, 2c) of glass-resin composite, with a thickness equal to approximately 1 mm, is formed, for example, of two times three stacks of continuous glass fibres ("Advantex" from Owens Corning; count 1200 tex), which are degassed and impregnated with a vinyl ester resin ("Atlac 590" from DSM+ "Irgacure 819" photoinitiator from Ciba), between which has been added a weft woven fabric made of glass fibre ("E" glass; weight per unit area 125 g/m$^2$), which is impregnated with a vinyl ester resin, for balancing the composite assembly. The final layer was obtained by filament winding (tape resulting from a 0.2×0.5 mm nozzle) at an angle of close to zero degrees. After winding (laying pitch of 5 mm) three individual stacks, the winding was halted and then the resin-impregnated weft woven fabric was deposited on the third stack, before winding the last three stacks of tape over the top of the weft woven fabric thus inserted. The assembly was then polymerized under UV radiation, on the winding support. According to another method of manufacture, it is possible, for example, to continuously wind as follows: a stack at 0°, then a stack at −5°, a stack at +5°, a stack at 0°, a stack at +5° and a stack at −5° are successively deposited and the process is completed with a stack at 0°, everything being done continuously. The stacks at +5° and −5° give sufficient lateral cohesion; the final thickness is always the same. Thus prepared, each layer of glass-resin composite has, for example, in the direction of its reinforcing fibres, a tensile modulus of the order of 45 GPa. For all the layers of composite which are described above, the content of fibres is, for example, approximately 70% (i.e., approximately 30% by weight of resin).

In this example of wheel (30) and of laminate (20) in accordance with the invention, each layer of silicone rubber composition is formed, for example, of a silicone rubber of PVMQ grade which is resistant to low temperatures, for example the product KE-183-U sold by Shin Etsu, which is crosslinkable with peroxide.

The structures (wheel spokes on the one hand, tread on the other hand) intended to be joined to the laminate of the invention can be directly connected to the layers (for example, 2b and 2c in FIG. 2) of fibre-resin composite by virtue of appropriate fixing means already described, or else indirectly connected by means of intermediate assembling parts, in particular by virtue of inserts made of metal, of plastic or of composite material, also having the role of reinforcing the assembling points.

The inserts (35a, 35b) assembling the wheel spokes (34) on the rigid hub (31), on the one hand, and on the shear band (20), on the other hand, have, for example, the shape of "I"s or of half "U"s, formed of a (fibre-resin) composite material, for example made of glass fibres/vinyl ester resin, with a thickness equal to approximately 1 mm. They were, for example, manufactured, as indicated above for the layers of glass-resin composite, by filament winding in 5 successive stacks, on a support having the shape of a flattened cylinder. After polymerization with ultraviolet radiation, the half "U"s were obtained by cutting from the flattened cylinder. The inserts (35b) assembling the wheel spokes (34) on the internal circumferential face (represented by example 2c in FIG. 2) of the laminate (20) are, for example, of the same thickness but of smaller size, for example in the shape of "I"s or of half "U"s, themselves made of composite material, such as glass fibres/vinyl ester resin; they were manufactured as indicated above for the other inserts. Due to their ability to flex, inserts, for example in the shape of half "U"s, can advantageously contribute to the elongation necessary for the wheel spokes during the functioning of the elastic wheel of the invention, in particular when the spokes may exhibit an insufficient elasticity.

It is possible, for the manufacture of the wheel (30) illustrated, for example, in FIGS. 3 and 4, to use any process for the appropriate assembling of the elements described above, for example by adopting the following consecutive stages:

manufacture of the laminate of the invention (10, 20) as described above, for forming the shear band (32);

positioning (bolting on the hub side) and bonding of the wheel spokes (34);

for example, the spokes (34) are adjusted to their correct length and bonded at their two ends to appropriate lugs (inserts 35a, 35b) made of composite, one to the radially innermost composite layer (2c) of the laminate (20) and the other to the metal hub (31); for example, the lug (35b) on the shear band side will be riveted, whereas that (35a) on the hub side is bolted;

positioning of the tread (33) and of its metal elements made of stainless steel, on the shear band; use is advantageously made of an ultra-thin adhesive layer (for example made of KE-183-U silicone) in order to then optimize the contact between, on the one hand, the external face (33b) and the internal face (33a) of the tread made of stainless steel and, on the other hand, between the internal face (33a) and the upper face (2b) made of glass-resin composite of the shear band (20);

simultaneous piercing of the internal face (33a) of the tread (33), of the complete shear band (20) (composite layers and silicone rubber layers), of the lug (35b) and of the wheel spokes (34), then riveting of the assembly through the above pierced holes.

To sum up, the laminate of the invention constitutes an economically highly advantageous alternative to the laminates, the shear layer of which consists of deformable composite cylinders, such as described in the patent applications mentioned in the introduction to the present statement. Like the latter, it makes possible use within very broad temperature ranges, which can typically vary from −250° C. to +150° C., but it is much simpler to manufacture.

Finally, which is not the least, severe running tests (on highly aggressive ground surfaces) carried out on the non-pneumatic tyres illustrated in FIG. 3 have shown that the laminated product of the invention, compared with the laminates of the above prior art, additionally contributed an at least equivalent stiffness to the shear band while conferring greater flexibility on the structure of the wheel, making it possible for it to take impacts better and absorb obstacles better.

The invention claimed is:

1. A laminate comprising at least one silicone rubber layer sandwiched between two fiber-resin composite layers comprising glass filaments embedded in a thermoset resin, wherein the silicone rubber layer has a thickness $T_1$ of between 1.5 and 3 times the thickness $T_2$ of each fiber-resin composite layer, with $T_2$ being between 0.25 and 2 mm, and wherein the silicone rubber layer and the fiber-resin composite layers are joined together by at least one adhesion primer.

2. The laminate according to claim 1, wherein $T_1$ is between 1 and 3 mm.

3. The laminate according to claim 2, wherein $T_1$ is between 1.5 and 2.5 mm.

4. The laminate according to claim 1, wherein $T_2$ is between 0.5 and 1.5 mm.

5. The laminate according to claim 1 comprising at least two silicone rubber layers and three fiber-resin composite layers.

6. The laminate according to claim 1, wherein the adhesion primer is based on an organosilane or organopolysiloxane.

7. The laminate according to claim 1, wherein the silicone rubber exhibits an apparent secant tensile modulus, at 10% elongation, measured at 20° C., which is less than 5 MPa.

8. The laminate according to claim 7, wherein the silicone rubber exhibits an apparent secant tensile modulus, at 10% elongation, measured at 20° C., which is between 1 and 5 MPa.

9. The laminate according to claim 8, wherein the silicone rubber exhibits an apparent secant tensile modulus, at 10% elongation, measured at 20° C., which is between 1 and 3 MPa.

10. The laminate according to claim 1, wherein the silicone rubber exhibits a tensile elongation at break, measured at 20° C., which is greater than 350%.

11. The laminate according to claim 10, wherein the silicone rubber exhibits a tensile elongation at break, measured at 20° C., which is greater than 400%.

12. The laminate according to claim 11, wherein the silicone rubber exhibits a tensile elongation at break, measured at 20° C., which is greater than 450%.

13. The laminate according to claim 1, wherein the silicone rubber is of the high temperature crosslinking type.

14. The laminate according to claim 1, wherein the silicone rubber is of a grade selected from the group consisting of MQ, FMQ, PMQ, VMQ, PVMQ and FVMQ.

15. The laminate according to claim 14, wherein the silicone rubber is of VMQ or PVMQ grade.

16. The laminate according to claim 15, wherein the silicone rubber is of PVMQ grade.

17. The laminate according to claim 1, wherein the silicone rubber exhibits a glass transition temperature Tgi which is less than −100° C.

18. The laminate according to claim 17, wherein the silicone rubber exhibits a glass transition temperature Tgi which is less than −110° C.

19. The laminate according to claim 17, wherein the silicone rubber exhibits an apparent secant tensile modulus, at 10% elongation ASM10, measured at −100° C., which is less than 30 MPa.

20. The laminate according to claim 19, wherein the silicone rubber exhibits an apparent secant tensile modulus, at 10% elongation ASM10, measured at −100° C., which is less than 20 MPa.

21. The laminate according to claim 17, wherein the silicone rubber exhibits an elongation at break Et, measured at −100° C., which is greater than 100%.

22. The laminate according to claim 21, wherein the silicone rubber exhibits an elongation at break Et, measured at −100° C., which is greater than 150%.

23. The laminate according to claim 1, wherein the silicone rubber is a composition based on silicone rubber and on at least one additive.

24. The laminate according to claim 23, wherein the additive is a crosslinking agent.

25. The laminate according to claim 24, wherein the additive is an organic peroxide type crosslinking agent.

26. The laminate according to claim 23, wherein the additive is a filler.

27. The laminate according to claim 26, wherein the additive is a silica type filler.

28. The laminate according to claim 1, wherein the glass transition temperature $Tg_2$ of the thermoset resin is greater than 30° C.

29. The laminate according to claim 28, wherein the glass transition temperature $Tg_2$ of the thermoset resin is greater than 70° C.

30. A finished article comprising the laminate according to claim 1.

31. A non-pneumatic wheel or tire comprising the laminate according to claim 1.

32. The laminate according to claim 1, wherein the silicone rubber layer comprises 100 phr of silicone elastomer.

* * * * *